2,888,453

NEW ACID AMIDE AZO-PIGMENT-DYESTUFFS

Max Schmid, Riehen, and Henri Streiff, Birsfelden, Switzerland, assignors to Ciba Limited, Basel, Switzerland, a Swiss firm No Drawing. Application October 4, 1957
Serial No. 688,117

Claims priority, application Switzerland October 11, 1956

6 Claims. (Cl. 260—174)

The present invention provides new azo-pigment-dyestuffs which are free from water-solubilizing groups and correspond to the general formula

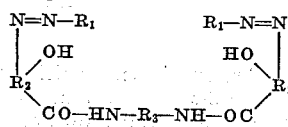

in which $R_1$ represents a benzene radical containing a carboxylic acid ester group in meta- or para-position to the azo-group, $R_2$ represents a naphthalene radical, in which the azo-, hydroxyl and —CONH— groups are in the 1:2:3-positions respectively, and $R_3$ represents an aromatic radical.

The invention also provides a process for the manufacture of the above pigments, which are carboxylic acid amide derivatives of azo-dyestuffs, wherein approximately one mol of an aromatic diamine which is free from water-solubilizing groups is condensed at the amino groups with two mols of the same, or with one mol each of two different, carboxylic acid halides which are also free from water-solubilizing groups and which correspond to the general formula

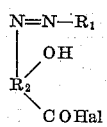

in which $R_1$ and $R_2$ have the meanings given above.

The starting materials used in the above process are free from water-solubilizing groups such as sulfonic acid groups, sulfonamide and carboxylic acid groups. The amines used as starting materials must contain at least two primary amino groups. Good results are obtained, more especially, with non-vattable aromatic diamines. As such diamines there may be mentioned mono-nuclear diamines as, for example, 1:4-diaminobenzene, 1:4-diamino-2:5 - dialkoxybenzene or 1:4 - diaminobenzenes which contain different substituents in the 2- and 5-positions as, for example, nitro groups, halogen atoms, alkoxy groups and alkyl groups.

In many cases especially valuable results are obtained by the use of di- and polynuclear amines as, for example, 4:4'-diaminodiphenyl and derivatives thereof such as 3:3'-dichloro-, 3:3'-dimethyl-, 3:3'-dialkoxy-4:4'-diaminodiphenyl-, 3:5:3':5'-tetrachloro-4:4'-diaminodiphenyl and 4:4'-diaminodiphenyl ether. Finally there also come into consideration diamines of a quite different kind, for example, 2:8-diaminochrysene, 4:11-diaminofluoranthrene, 2:6- or 1:5-diaminonaphthalene, diaminobenzthiazoles as, for example 2-(4'-aminophenyl)-6-aminobenzthiazole.

The carboxylic acid halides serving as starting materials in the above process can be made by treating azo compounds, in which the azo group is bound to a benzene ring which contains in the para- or advantageously in the meta-position to the azo group a carboxylic acid ester group and which contains as the sole water-solubilizing group a free carboxylic acid group, with acid halogenating agents. These azo compounds contain, advantageously, a single azo group, and may suitably be prepared by coupling a diazotized amine of the benzene series, which contains in the para- or especially in the meta-position to the diazotized amino group a carboxylic acid ester group, with a 2:3-hydroxynaphthoic acid, which, if desired may be substituted in the benzene ring that is free from the carboxylic acid group by a halogen atom, an alkoxy-group or alkyl-group. Advantageously there is used, however as a result of its easy accessibility, unsubstituted 2:3-hydroxynaphthoic acid.

The carboxylic acid ester group may be, for example, a carboxylic acid aryl ester group, for example, a carboxylic acid phenyl ester group, in which the phenyl radical may be further substituted by alkyl groups, such as methyl- or ethyl-groups, alkoxy groups, such as methoxy- or ethoxy-groups, or halogen atoms, such as chlorine. There are of special interest the diazo-components which contain carboxylic acid alkyl-ester groups, especially those with low molecular alkyl radicals, as, for example, carboxylic acid methyl-, -ethyl-, n-propyl-, isopropyl- or butyl-ester groups. As examples there may be mentioned the following compounds:

Phenyl esters, or alkyl esters, especially those containing up to 6 carbon atoms in the alkyl group, for example, propyl-, butyl-, amyl- and hexyl esters, advantageously the methyl- or ethyl-ester of 1-aminobenzene-4-carboxylic acid or of 1-amino-2-nitrobenzene-4-carboxylic acid. There are of special interest, however, the methyl- and ethyl-esters of meta-aminobenzoic acids, for example 1-aminobenzene-3-carboxylic acid, 1-amino-3- or -4-nitrobenzene-5-carboxylic acid, 1-amino-2-methoxy- or -phenoxy-benzene-5-carboxylic acid, 1-amino-4-phenoxy-benzene-5-carboxylic acid, but above all 1-amino-2-chlorobenzene-5-carboxylic acid.

The azo-carboxylic acids are treated with agents which enable carboxylic acids to be converted into their halides, for example, the chloride or bromide, especially with phosphorus halides such as phosphorus pentabromide or phosphorus trichloride or -pentachloride, phosphorus hydroxyhalides, and especially with thionyl chloride.

The treatment with such acid-halogenating agents is advantageously carried out in inert organic solvents such as dimethyl-formamide, chlorobenzenes, for example, mono- or di-chlorobenzene, toluene, xylene or nitrobenzene, if desired, with an addition of dimethylformamide.

In the preparation of the carboxylic acid halides it is generally advantageous if the azo-compounds which are obtained in an aqueous medium are first dried for example by boiling in an organic solvent which forms an azeotrope with water to free them from water. This azeotropic drying can, if desired, be carried out immediately before the treatment with the acid halogenating agents.

The products of the invention are valuable, new pigments, especially those in which $R_2$ in the general formula given in the first paragraph above represents a radical of the formula

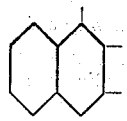

and wherein $R_1$ is a benzene radical in which the carboxylic acid ester group is in the meta-position to the azo group. They are particularly suitable for the coloring of polyvinyl compounds, for example, by rolling them into polyvinyl chloride foils, and as compared with dyestuffs of similar structure, which contain a carboxylic acid ester group in ortho-position to the azo group, are distinguished by a better resistance to light and by their easy accessibility, and are also distinguished by a very good resistance to migration, heat resistance and also resistance to solvents. Therefore they are also valuable for the so-called pigment printing, that is to say, for printing methods which depend upon fixing the pigment by means of a suitable adhesive agent, such as casein, heat-hardenable synthetic resins, especially urea- or melamine-formaldehyde condensation products, polyvinyl chloride or polyvinyl acetate solutions or emulsions or other emulsions (for example, oil-in-water or water-in-oil emulsions), to a substratum especially to textile fibers, but also to flat structures, such as paper (for example, wall-paper) or to glass-fiber fabrics. The pigments of the invention can also be used for other purposes, for example, for the coloring of artificial silk and viscose or cellulose ethers and -esters or super-polyamides or super-polyurethanes by incorporation in finely divided form in the spinning composition, as well as for the manufacture of color lacquers or lacquer-formers, solutions and products from acetylcellulose, nitro-cellulose, natural or synthetic resins, such as polymerisation- or condensation resins, for example, aminoplasts, phenoplasts, polystyrene, polyethylene, polyacrylate, rubber, casein, silicon and silicon resins. Furthermore they may be advantageously used in the manufacture of colored pencils, cosmetic preparations or laminates.

Preparations which contain the pigments in finely divided form can be obtained in known manner by intensive mechanical treatment, for example, by passing between rollers or by means of suitable kneading apparatus. For this purpose there is chosen for the dispersion and the intensive working a suitable medium according to the desired purpose in view, for example, for the manufacture of aqueous dispersible preparations there may be used sulfite waste liquor or naphthyl-methane-disulfonic acid salts, and for the manufacture of acetate-artificial silk spinning preparations there is used acetylcellulose mixed with a small quantity of solvent.

In consequence of the especially good physical form in which the products of the invention are generally obtained, and in view of their chemical inertness and good resistance to temperature, they can normally be readily distributed in the compositions or preparations of the above-mentioned kind and advantageously at a moment when these compositions or preparations do not yet occupy their final form. The required shaping methods, such as spinning, pressure moulding, hardening, casting or sticking or other methods can be carried out directly in the presence of the pigment without hindrance to any chemical reactions of the substratum, such as further polymerization of condensation.

The following examples illustrate the invention, the parts being by weight unless otherwise stated.

*Example 1*

70 parts of the monoazo-dyestuff from diazotized 1-aminobenzene-3-carboxylic acid methyl ester and 2-hydroxy-naphthalene-3-carboxylic acid were introduced while stirring into 300 parts by volume of chlorobenzene. 20 parts of thionyl chloride were added to the mixture which was then heated to a gentle boil. After a few minutes the acid chloride of the dyestuff went into solution. The reaction mixture was stirred for a further period of time at the boiling temperature and then allowed to cool. The crystalline product which separated was suction-filtered and after washing with a little cold chlorobenzene was dried in vacuo at 70 to 80° C. (melting point of the acid chloride was 169 to 171° C., with decomposition).

73.7 parts of the acid chloride obtained as described above were introduced into 2000 parts by volume of dry chlorobenzene and 20 parts of pyridine. 10.8 parts of 1:4-diaminobenzene were added to the mixture which was heated, while stirring to the boil. Boiling was continued for about 24 hours. At the end of the condensation the pigment thus formed was filtered while hot, washed with warm chlorobenzene and with hot alcohol and then dried. The condensation dyestuff of the formula

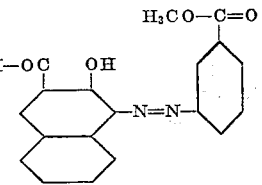

was obtained as a brown pigment which was difficultly-soluble to insoluble in the usual solvents and when rolled into polyvinyl chloride gave full brown-red tints of very great resistance to migration and to light.

The above mentioned monoazo-dyestuff can be obtained as follows:

30.2 parts of 1-aminobenzene-3-carboxylic acid methyl ester were introduced into 300 parts of water, 100 parts of ice and 58 parts of 30% hydrochloric acid and for the purpose of forming the hydrochloride the mixture was stirred for about ¼ hour. It was then cooled with ice to 0° C. and 50 parts by volume of 4 N-sodium nitrite solution were run in at 0 to 5° C. through a dropping funnel under the surface. The mixture was stirred for ½ hour and the almost colorless diazo solution was then filtered. The clear diazo solution was added at 0 to 10° C. to a solution of 37.6 parts of 2-hydroxynaphthalene-3-carboxylic acid in 500 parts of water, 28 parts of 30% sodium hydroxide solution and 40 parts of sodium carbonate. Stirring was continued until the end of the coupling, and the product was filtered and washed with water. The filtered product was suspended in 1500 parts of cold water and, for the purpose of conversion into the free dyestuff-acid, was reacted with about 58 parts of 30% hydrochloric acid (until acid to Congo). The reaction mixture was stirred for about 3 hours at room temperature, filtered and washed with cold water until neutral to Congo. The dried and pulverized azo dyestuff was a light-red powder having a melting point of 245 to 246° C.

By using in the above example instead of 10.8 parts of 1:4-diaminobenzene, 15.8 parts of 1:5-diamino naphthalene or 25.3 parts of 4:4-diamino-3:3'-dichlorodiphenyl, there are obtained pigments which when rolled into polyvinylchloride foils give Bordeaux-red or orange tints of very good resistance to light.

*Example 2*

79.7 parts of the monoazo dyestuff from diazotized 1-amino-2-chlorobenzene-5-carboxylic acid ethyl ester and 2-hydroxynaphthalene-3-carboxylic acid were introduced with stirring into 600 parts by volume of nitrobenzene. 20 parts of thionyl chloride were added to the mixture which was then heated to 140 to 150° C. After about ½ hour the acid chloride of the dyestuff went into solution. The solution was stirred for about a further ½ hour and allowed to cool. The crystalline product which separated was filtered and after washing with a little cold nitrobenzene and cold chlorobenzene was dried in vacuo at 70 to 80° C. (melting point of the acid chloride 220 to 222° C.)

83.4 parts of the acid chloride so obtained were introduced into 2000 parts by volume of dry chlorobenzene and 20 parts of pyridine. 18.4 parts of 4:4′-diaminodiphenyl were added to the mixture which was then heated while stirring to the boiling point. Boiling was continued for about 24 hours. After completion of the condensation the pigment so formed was filtered while still hot, washed with warm chlorobenzene, then with hot alcohol and dried. The condensation dyestuff of the formula

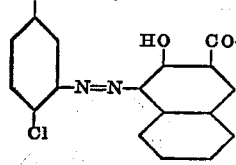

was obtained as an orange-brown pigment which was difficultly soluble to insoluble in the usual solvents and when rolled into polyvinyl chloride gave full scarlet tints of very good resistance to migration and to light.

By using instead of 4:4′-diaminodiphenyl equivalent amounts of other diamines, there can be obtained corresponding condensation dyestuffs which color polyvinylchloride foils tints having very good resistance to light and of the following shades:

4:4′-diamino-3:3′-dimethylphenyl _____ brown-red.
4:4′-diamino-3:3′-dichlordiphenyl _____ red-orange.
4:4′-diamino-3:3′-dimethoxydiphenyl _____ Bordeaux.
4:4′-diaminobenzene _____ scarlet.
4:4′-diamino-2-chlorobenzene _____ scarlet.
4:4′-diamino-2:5-dichlorobenzene _____ scarlet.
4:4′-diaminodiphenyl-ether _____ orange-red.

By using instead of the dyestuff from diazotized 1-amino-2-chlorobenzene-5-carboxylic acid ethyl ester and 2-hydroxy-naphthalene-3-carboxylic acid, 86.2 parts of the dyestuff from diazotized 1-amino-2-chlorobenzene-5-carboxylic acid isopropyl-ester and 2-hydroxynaphthalene-3-carboxylic acid, or 80.6 parts of the corresponding azo-dyestuff from diazotized 1-amino-2-chlorobenzene-5-carboxylic acid methyl ester or 89 parts of the corresponding azo dyestuff from diazotized 1-amino-2-chlorobenzene-5-carboxylic acid -n-butyl ester, or 93 parts of the corresponding azo dyestuff from diazotized 1-amino-2-chlorobenzene-5-carboxylic acid phenyl ester and 2-hydroxynaphthalene-3-carboxylic acid and converting these dyestuffs according to the method described in this example into their acid chlorides and condensing with 18.4 parts of 4:4′-diaminodiphenyl, there are obtained pigments having properties similar to that of the pigment described in the first part of this example.

*Example 3*

70 parts of the dyestuff obtained in usual manner from diazotized 1-aminobenzene-4-carboxylic acid methyl ester and 2-hydroxynaphthalene-3-carboxylic acid were introduced while stirring into 400 parts by volume of 1:2-dichlorobenzene. 7.3 parts of dimethylformamide and 20 parts of thionyl chloride were added and the mixture was then heated to 130 to 140° C. After a short time the acid chloride of the dyestuff went into solution. The temperature was kept at 130 to 140° C. for about an hour and the mixture then allowed to cool. The crystalline product which separated was filtered and after washing with a little cold dichlorobenzene and chlorobenzene was dried under vacuum at 70 to 80° C. (melting point of the acid chloride 208 to 210° C.).

73.7 parts of the acid chloride so obtained were introduced into 2000 parts by volume of dry chlorobenzene and 20 parts of pyridine. 24.4 parts of 4:4′-diamino-3:3′-dimethoxydiphenyl were added to the mixture which was then heated with stirring to the boiling point. Boiling was continued for about 24 hours. After completion of the

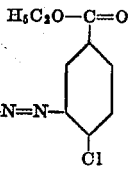

condensation the pigment thus formed was filtered while still hot, washed with warm chlorobenzene, and with hot alkahol and then dried. The condensation dyestuff of the formula

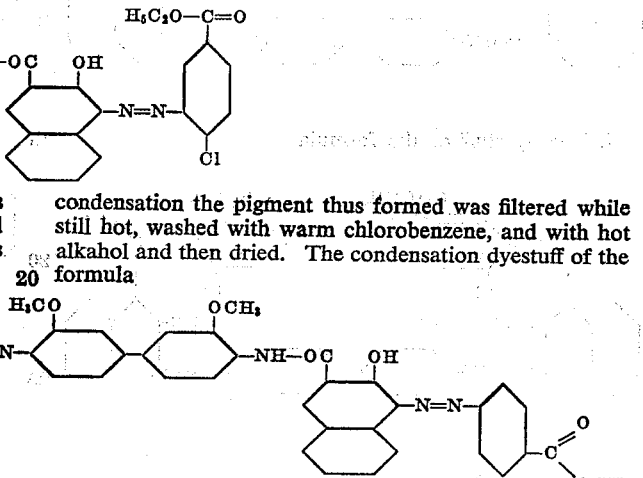

was obtained as a red-brown pigment which was difficultly soluble to insoluble in the usual solvents and when rolled into polyvinyl chloride gave full Bordeaux-red tints of very good resistance to migration and to light.

By using instead of 4:4′-diamino-3:3′-dimethoxydiphenyl 25.3 parts of 4:4′-diamino-3:3′-dichloro-diphenyl or 15.8 parts of 1:5-diaminonaphthalene, there can be obtained condensation dyestuffs which are similarly difficultly soluble to insoluble in the usual solvents and which, when rolled into polyvinyl chloride foils, yield scarlet or Bordeaux-red tints having very good resistance to migration and to light.

*Example 4*

65 parts of polyvinyl chloride, 35 parts of dioctyl phthalate and 0.2 part of the pigment obtained as described in Example 1 were mixed together and then rolled on a two-roll-calender mill for 7 minutes at 140° C. There was obtained a brown-red colored foil having very good resistance to light and to migration.

What is claimed is:
1. An azo pigment of the formula

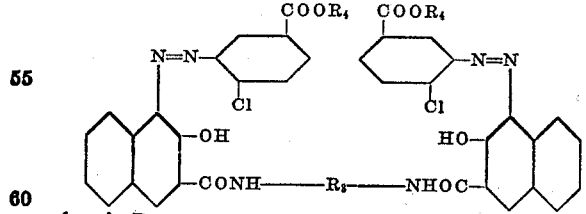

wherein R₄ represents a member selected from the group consisting of an alkyl radical having at most 6 carbon atoms and a phenyl radical and R₃ represents an aryl radical consisting solely of carbocyclic rings and at most of 2 such rings.

2. The dyestuff of the formula

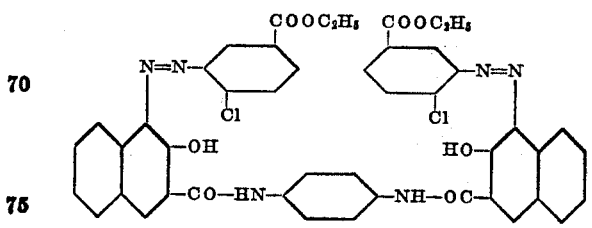

3. The dyestuff of the formula
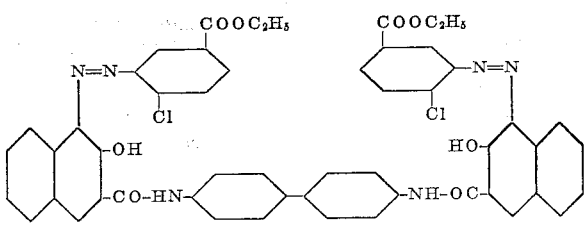
4. The dyestuff of the formula
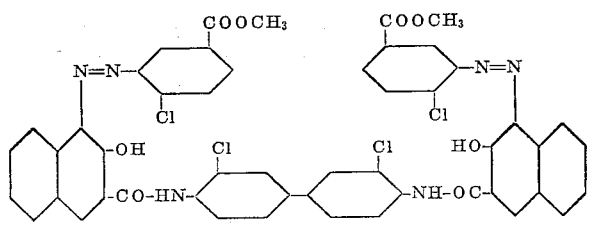
5. The dyestuff of the formula
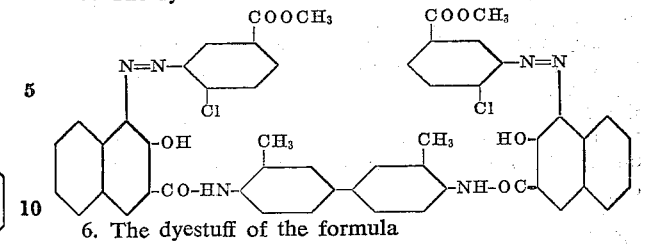
6. The dyestuff of the formula
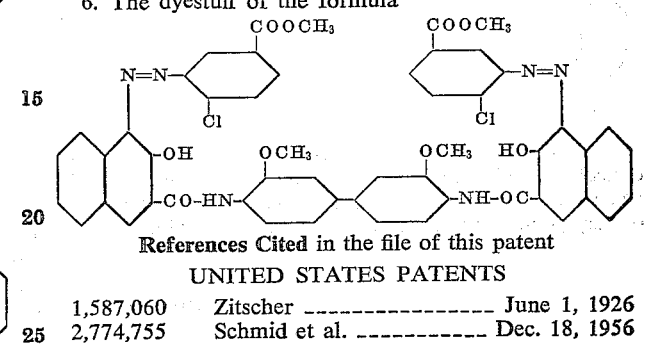
References Cited in the file of this patent
UNITED STATES PATENTS
| | | |
|---|---|---|
| 1,587,060 | Zitscher | June 1, 1926 |
| 2,774,755 | Schmid et al. | Dec. 18, 1956 |